3,004,210
POWER TRANSMISSION

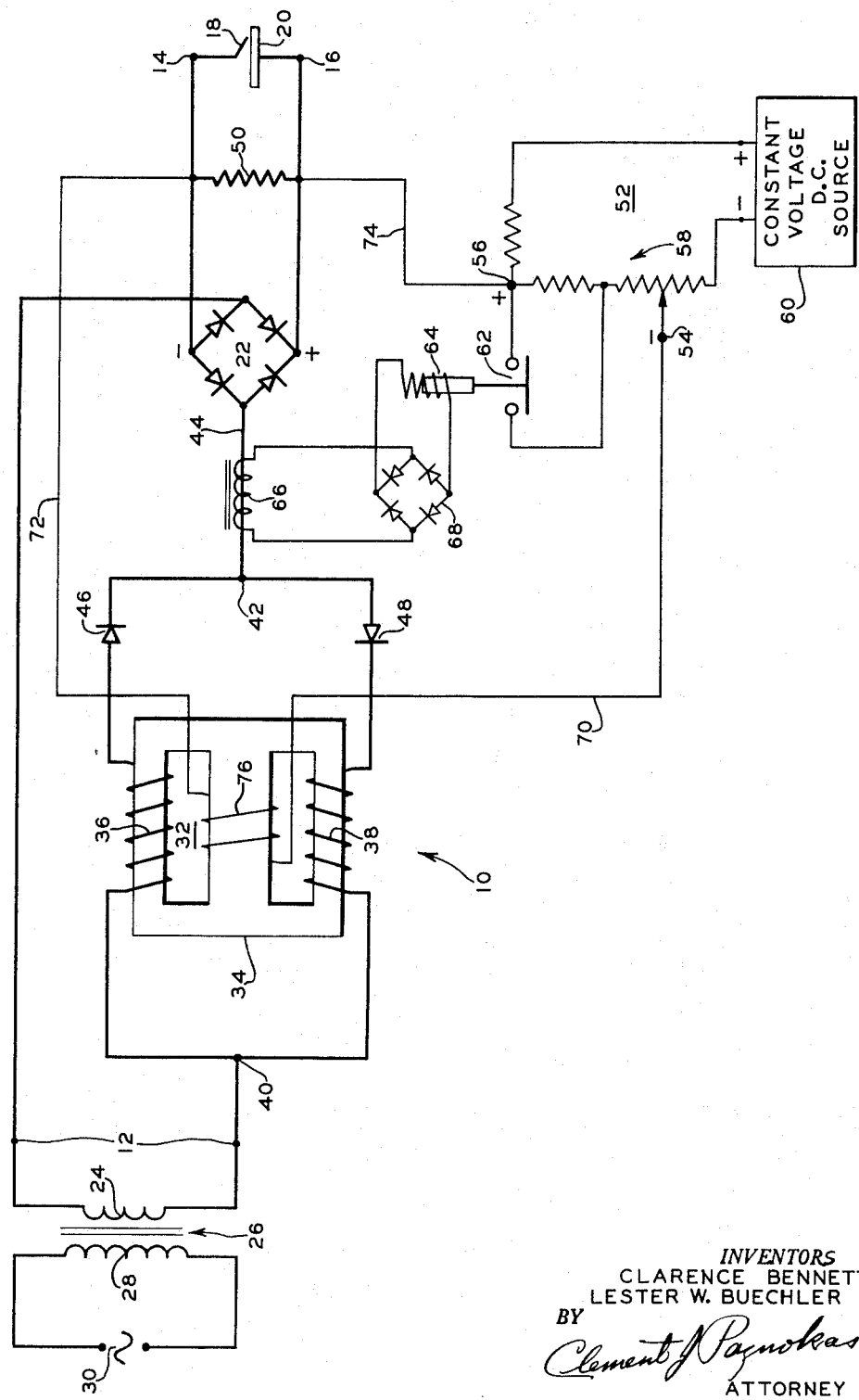

Clarence Bennett, Lemay, and Lester W. Buechler, Kirkwood, Mo., assignors to Vickers, Incorporated, Detroit, Mich., a corporation of Michigan
Filed June 1, 1956, Ser. No. 588,802
2 Claims. (Cl. 323—89)

This invention relates to power transmission and more particularly to power supplies controlled by saturable electromagnetic devices.

In constant potential arc welding power supplies which are regulated by controllable saturable-core reactors, the reactor cores have a particular saturation level during the open circuit or no-load status. In order to supply the first small increment of welding current when welding is started, an appreciable increase in the flux level of the core is required. This change in core saturation requires considerable time, and as a result, when welding is started, voltage drops to an undesirably low value until the regulating system "takes hold."

In accordance with the present invention the time delay in reaching desired welding voltage is avoided and high initial current surge may be obtained by providing, while the apparatus is under no load, an added component of core saturation which increases the saturation level of the reactor core over that which would be provided by the regulating system when regulating the output voltage to the normal operating value. This makes the open circuit voltage higher than the voltage to which the apparatus will regulate in normal operation, and under no load, raises the magnetic state of the core to a higher level, for example to a level equal to or near that required in normal welding. Thus, when welding is started, no great change in magnetic state is required, and the welder quickly assumes the desired welding voltage. Upon application of load, the added component of core saturation is removed so that the regulator will regulate the output at the desired operating value.

In a specific embodiment of the invention the above is accomplished by providing an added component of core saturation during open circuit, and as soon as welding current starts flowing, and in response to that current, operating a switch which removes the excess component of saturation thereby bringing the reactor core to a magnetic state which will cause the apparatus to regulate to its normal operating voltage.

It is therefore an object of the present invention to avoid the time delay required for an output condition of a saturable-core reactor regulated power supply to reach its normal regulated value after load has been applied.

Another object of the present invention is to avoid the time delay required for the output voltage of a constant voltage saturable-core reactor regulated power supply to reach its normal regulated value after load has been applied.

Another object of the invention is to avoid the time delay required for an output condition of a saturable-core reactor regulated power supply for arc loads to reach its normal regulated value after an arc load has been applied.

Another object of the present invention is to avoid the time delay required for the output voltage of a constant voltage saturable-core reactor regulated power supply for arc loads to react its normal regulated value after an arc load has been applied.

Still another object of the present invention is to avoid the time delay required for the output voltage of a constant voltage saturable-core reactor regulated welding apparatus to reach its normal regulated value after welding is started.

A further object of the present invention is to provide a high initial current surge upon application of load to a saturable-core reactor regulated power supply.

Further objects and advantages of the present invention will be apparent from the following description, reference being had to the accompanying single figure drawing, wherein a schematic diagram of a preferred form of the present invention is clearly shown.

The apparatus shown in the drawing is a constant potential direct current arc welder whose output voltage is controlled and regulated at a constant desired operating value by a magnetic amplifier 10 which is interposed between the alternating current input 12 of the apparatus and the direct current output terminals 14 and 16 of the apparatus, to which the welding electrodes 18 and 20 are connected. The particular magnetic amplifier shown has an alternating current output which is rectified by a full-wave rectifier 22 before it reaches the output terminals 14 and 16.

The input 12 of the apparatus is connected to the secondary winding 24 of a welding transformer 26 having a primary winding 28 connected to a source of alternating current 30. The magnetic amplifier 10 includes a reactor 32 with a saturable core 34 carrying a pair of parallel connected load windings 36 and 38, one end of the parallel connection 40 being connected to one of the A.C. input terminals 12, while the other parallel connection 42 is connected through conductor 44 to an input terminal of the full-wave rectifier 22, the other terminal of rectifier 22 being connected to the other of the A.C. input terminals 12. Self-saturation for the reactor 32 is provided by rectifiers 46 and 48 in series with the load windings 36 and 38, respectively. Reverse relation of rectifiers 46 and 48 causes the magnetic amplifier 10 to provide alternating current to the rectifier 22 through the conductor 44. The particular magnetic amplifier shown by way of example is known as a doubler type self-saturating magnetic amplifier.

Although a bleeder resistor 50 is shown connected across the output terminals 14 and 16, the bleeder effect may be obtained by utilizing high leakage rectifier cells in the rectifier 22.

In order to regulate the voltage at the output terminals 14 and 16 the voltage thereacross is compared to a reference voltage provided by a reference network 52 at the network terminals 54 and 56 in the comparative polarity shown. The reference network 52 includes a voltage divider 58 connected across the output of a constant voltage direct current supply source 60. There is connected across a portion of the voltage divider a pair of normally open contacts 62 of a relay 64, which contacts when closed short out a portion of the voltage divider 58 thereby reducing the value of reference voltage supplied by the reference network. The normally open relay contacts 62 are closed when the relay 64 is energized from a current transformer 66 through a rectifier 68 in response to the flow of welding current when welding is started. When relay 64 is de-energized the contacts 62 are open.

The reference voltage at terminals 54 and 56 opposes the voltage across the output terminals 14—16 in a circuit which includes conductors 70, 72 and 74, and a winding 76 on the reactor core 34. The relation of the windings 36, 38 and 76 is such that current of a given polarity in winding 76 affects the output of both load windings 36 and 38 in the same manner. Current of one polarity in winding 76 increases the saturation of the core and increases the output of the load windings 36 and 38, while current of the opposite polarity decreases the core saturation and reduces the output of both load windings.

In order to maintain a constant voltage at the output terminals 14—16, the circuit is arranged so that when the output voltage drops below the desired regulated value the difference between the output and reference voltages causes a current to flow in winding 76 in a direction to raise the core saturation of reactor 32 until the output and reference voltages are balanced, at which point output voltage has been restored to its desired value.

The apparatus is arranged so that when normally open contacts 62 are closed the proper reference voltage is provided at reference terminals 54 and 56 to cause the apparatus to regulate to a desired output voltage while welding. This may be termed normal operating or welding voltage.

When contacts 62 are open the reference voltage is higher and raises the output voltage of the apparatus to a higher regulated voltage thereby supplying an added component of core saturation over the value required to cause the apparatus to regulate at the normal operating voltage. Thus, the reactor core is biased in the direction of saturation by the added component of saturation. Relay 64 is arranged to be unenergized and contacts 62 open as long as little or no current flows through conductor 44. In practical examples the relay 64 was made to operate when the external load applied to output terminals 14—16, as by touching the welding electrodes 20, caused load current flow of from 1% to 5% of the normal operating range of the apparatus. For example, if the operating range of the apparatus is 100 to 500 amperes, the relay 64 may be designed to be energized and close contacts 62 when the external load current is from 2.5 to 20 amperes. As soon as contacts 62 close the added component of core saturation and the positive bias supplied thereby is removed, and only the saturation level required to regulate the apparatus to the normal operating voltage remains.

An example of the operation of the apparatus may be as follows. Taking for example, a welder with an operating current range of 100 to 500 amperes, and which operates at a regulated constant voltage whose value, depending on the welding load, may be a value within the range of 15-35 volts. Thus, the normal operating voltage for a particular load of 250 amperes may be for example 27 volts. The reference voltage supplied by the reference network at its terminals 54—56 when contacts 62 are closed is adjusted to a value which will regulate the output voltage of the system to 27 volts at output terminals 14—16. This provides a bias to the system and a core saturation necessary to regulate the system to the desired normal operating voltage of 27 volts. The reference voltage at terminals 54—56 with contacts 62 open is adjusted to provide for an open circuit (no load) voltage of 35 volts as an example, thus biasing the system upward (positively) and providing an added component of core saturation over and above that required to regulate at the normal operating voltage.

At no load the relay 64 is de-energized and contacts 62 are open. The open circuit voltage is higher than normal operating voltage and the core is biased upwardly by the added component of saturation. When the electrode is touched to the welding work there is an initial high current surge. As soon as welding current starts to flow, relay 64 is energized and contacts 62 are closed thereby lowering the reference voltage, removing the added component of core saturation, thus lowering the core saturation level to that required to regulate to the normal operating voltage. The switching by the relay occurs before the regulating system "takes hold" to regulate at 35 volts, the higher open circuit voltage, after load is applied. After switching the apparatus regulates to normal operating voltage (in the example 27 volts).

It will be noted that in the particular arrangement shown, the current in the control winding 76 includes the output voltage component in the negative feedback direction, that is the output voltage tends to desaturate the reacor and drive it down. On the other hand, the reference or bias voltage opposes the output voltage and tends to saturate the reactor and drive its ouput up.

While the form of embodiment of the invention as herein disclosed constitutes a preferred form, it is to be understood that other forms might be adopted, all coming within the scope of the claims which follow.

What is claimed is as follows:

1. Power supply apparatus comprising input means for receiving alternating current, output means for connection to a load, a magnetic amplifier with a saturable core, a load winding and control winding means inductively related to said core, said load winding being interposed between said input and output means, control circuit means including said control winding means and a reference source for comparing the output voltage of the apparatus to said reference thereby to regulate said output voltage, switch means for selecting a particular reference value from the reference source at no load, said switch means being responsive to the application of load for selecting a different reference value.

2. Welding power supply apparatus comprising input means for receiving alternating current, output means for connection to a load, a magnetic amplifier with a saturable core, a load winding and control winding means inductively related to said core, said load winding being interposed between said input and output means, control circuit means including said control winding means and a reference source for comparing the output voltage of the apparatus to said reference thereby to regulate said output voltage, switch means for selecting a particular reference value from the reference source at no load, said switch means being responsive to the application of load for selecting a lower reference value.

References Cited in the file of this patent
UNITED STATES PATENTS

| | | |
|---|---|---|
| 2,548,049 | Olson | Apr. 10, 1951 |
| 2,549,782 | Engelman | Apr. 24, 1951 |
| 2,620,465 | Giroz | Dec. 2, 1952 |
| 2,673,324 | Burton et al. | Mar. 23, 1954 |
| 2,693,569 | Diebold | Nov. 2, 1954 |
| 2,765,436 | Dornhoefer | Oct. 2, 1956 |
| 2,800,623 | Belamin | July 23, 1957 |